United States Patent
Itoh et al.

[11] Patent Number: 5,925,207
[45] Date of Patent: *Jul. 20, 1999

[54] AUTOMOTIVE INTERIOR COMPONENTS, AND METHOD AND DEVICE FOR MANUFACTURING THE SAME

[75] Inventors: Shoichi Itoh; Shozo Yabushita, both of Kanagawa-ken, Japan

[73] Assignee: Kasai Kogyo Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,499

[22] Filed: Mar. 31, 1997

Related U.S. Application Data

[62] Division of application No. 08/434,917, May 4, 1995, abandoned.

[30] Foreign Application Priority Data

Jan. 16, 1991 [JP] Japan .................................. 3-003338

[51] Int. Cl.[6] ................................................. B32B 31/00
[52] U.S. Cl. ........................ 156/216; 156/212; 156/308.2; 156/322; 156/497
[58] Field of Search ................................. 156/216, 497, 156/322, 308.2, 212

[56] References Cited

U.S. PATENT DOCUMENTS

| | | |
|---|---|---|
| 3,075,862 | 1/1963 | Hoyer . |
| 4,035,224 | 7/1977 | Anderson . |
| 4,385,090 | 5/1983 | Sims ........................................ 156/216 |
| 5,080,742 | 1/1992 | Takahashi .......................... 156/216 X |
| 5,139,604 | 8/1992 | Mitchell .............................. 156/216 X |
| 5,318,647 | 6/1994 | Mitchell .................................. 156/216 |
| 5,565,053 | 10/1996 | Happich ................................... 156/216 |
| 5,609,709 | 3/1997 | Doumae et al. ........................ 156/216 |
| 5,718,791 | 2/1998 | Spengler ................................. 156/216 |

FOREIGN PATENT DOCUMENTS

| | | |
|---|---|---|
| 2 240 107 | 3/1975 | France . |
| 2 429 667 | 1/1980 | France . |
| 834 649 | 3/1952 | Germany . |
| 3 327 462 | 2/1985 | Germany . |
| 51-84012 | 12/1949 | Japan . |
| 56-11218 | 3/1952 | Japan . |
| 52-979 | 1/1977 | Japan . |
| 52-87478 | 7/1977 | Japan . |
| 2-204123 | 8/1980 | Japan . |
| 59-201814 | 11/1984 | Japan . |
| 01 520 842 | 8/1978 | United Kingdom . |

OTHER PUBLICATIONS

Patent Abstracts of Japan, vol. 7, No. 269 (M–259) [414] Nov. 30, 1983.

Patent Abstracts of Japan, vol. 9, No. 77 (M–369) [1800], Apr. 6, 1985.

*Primary Examiner*—Jeff H. Aftergut
*Attorney, Agent, or Firm*—Dickstein Shapiro Morin & Oshinsky, LLP

[57] ABSTRACT

An automotive interior component consisting of a resin core member having a required shape and a surface skin member for imparting a favorable surface property thereto in which a peripheral portion of the surface skin member is folded back and secured onto a reverse surface of a resin core member in a quick and reliable manner without using any bonding agent, and a device and method for manufacturing the same. By blowing hot air produced from an annular hot air supply pipe arranged along a reverse surface of the peripheral portion of the resin core member and a reverse surface of the folded back portion of the surface skin member which is combined with the resin core member as a half-finished assembly, the folded back portion of the surface skin member is thermally welded and secured to the reverse surface of the resin core member.

7 Claims, 8 Drawing Sheets

AUTOMOTIVE INTERIOR COMPONENTS, AND METHOD AND DEVICE FOR MANUFACTURING THE SAME

This application is a division of application Ser. No. 08/434,917, filed May 4, 1995, now abandoned.

TECHNICAL FIELD

The present invention relates to automotive interior components such as automotive door trims as well as a method and device for manufacturing the same.

BACKGROUND OF THE INVENTION

As a general structure for automotive interior components such as door trims, there is known the laminated structure in which a surface skin member having a cushioning and favorable appearance quality is bonded over a surface of a core member having the capability to retain its shape and the rigidity required for mounting it on a door panel.

FIG. 9 shows the structure of an automotive door trim 1 given here as a typical example of automotive interior component. In this door trim 1, a surface skin member 3 is integrally bonded over a surface of a resin core member 2 molded into a desired shape, and this surface skin member 3 consists of a surface skin sheet 4 with a back lining of a foamed layer 5 of such a material as polyethylene foam or polypropylene foam to ensure a necessary buffering or cushioning and ornamental quality. Along the edge of the product, the surface skin member 3 is folded over and bonded to the reverse surface of the resin core member 2 along its edge to produce a favorable edge finish.

To realize such a structure, as shown in FIG. 10, a bonding agent 6 is applied to a reverse surface of a peripheral portion 2a of the resin core member 2 and a reverse surface of a peripheral portion 3a of the surface skin member 3 extending beyond the edge of the resin core member 2 so that the peripheral portion 3a of the surface skin member 3 may be securely attached to the peripheral portion 3a of the reverse surface of the resin core member 3 by means of the bonding capability of the bonding agent 6.

When a tactic resin such as polypropylene is used as the material for the resin core member 2 by taking into account such considerations as cost, moldability and mechanical strength, since the tactic resin is chemically stable and lacks the bonding capability based on chemical or ionic bonding, it is necessary to make the surface reasonably coarse by using sand paper or the like or to apply a primer layer 7 (such as carbontetrachloride) thereon, as illustrated in FIG. 11, before applying a coating of the bonding agent 6.

Thus, according to the conventional automotive interior component, since the folded back peripheral portion 3a of the surface skin member 3 is secured by adhesive bonding, the edge processing for the surface skin member required the three steps of applying a bonding agent thereto, drying (reactivating) the bonding agent, and bonding of the folded back peripheral portion 3a, and these steps required such devices and facilities as a bonding agent applying booth, an oven and a bonding device which contribute to a substantial increase in manufacturing cost.

Further, since the bonding agent contains an organic solvent, the working environment is not favorable, and a ventilation system such as a ventilation duct becomes necessary to expel the solvent from the working environment. Thus, the need for facilities related to the use of a bonding agent also contributes to the increase in cost.

BRIEF SUMMARY OF THE INVENTION

In view of such problems of the prior art, a primary object of the present invention is to provide an automotive interior component in which the peripheral portion of the surface skin member can be securely attached to the reverse surface of the resin core member along its edge without using any bonding agent.

Further, in view of the fact that the use of polypropylene resin as the resin core member necessarily involved the need for the five steps of primer application, drying, bonding agent application, drying (reactivation), and bonding, another object of the present invention is to provide an automotive interior component using a polypropylene core member which allows a substantial simplification of the edge processing step for the surface skin member.

Yet another object of the present invention is to provide a method and device for simply and efficiently manufacturing such an automotive component part according to the present invention.

These and other objects of the present invention can be accomplished by providing an automotive interior component, comprising: a resin core member molded into a desired shape; and a skin member at least partly bonded over a surface of the resin core member, the skin member being provided with a peripheral portion extending beyond a peripheral edge portion of the resin core member, the peripheral portion of the surface skin member being folded back and thermally welded onto a reverse surface of the peripheral edge portion of the resin core member. The resin core member may consist of polypropylene resin, and the surface skin member may consist of a laminated sheet formed by laminating a foamed layer such as a foamed polyethylene foam or a polypropylene foam over a reverse surface of a surface skin sheet such as a PVC sheet.

As can be understood from the above described structure, since the folded back peripheral portion of the surface skin member is secured to the peripheral portion of the reverse surface of the resin core member by thermal welding, the need for a bonding agent or a primer can be eliminated.

Such a structure can be favorably manufactured by thermally melting the reverse surface of the peripheral edge portion of the resin core member and the reverse surface of the peripheral portion of the surface skin member by blowing hot air thereto; and folding back the peripheral portion of the surface skin member onto the reverse surface of the peripheral portion of the resin core member, and thermally welding the folded back peripheral portion of the surface skin member to the reverse surface of the peripheral edge portion of the resin core member.

Preferably, the peripheral portions of the resin core member and the surface skin member are thermally melted simultaneously by common hot air blower means when the resin core member and the surface skin member are combined as a half-finished assembly with the peripheral portion of the surface skin member extending beyond the peripheral edge portion of the resin core member. The common hot air blower means may comprise an annular hot air pipe surrounding the peripheral portions of the resin core member and the surface skin member, and provided with orifices for blowing hot air thereto.

Thereby, it is possible to heat and melt the reverse surface of the peripheral edge portion of the resin core member along with the reverse surface of the peripheral portion of the surface skin member which is to be folded back onto the peripheral portion of the resin core member, simultaneously, in a quick and efficient manner.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
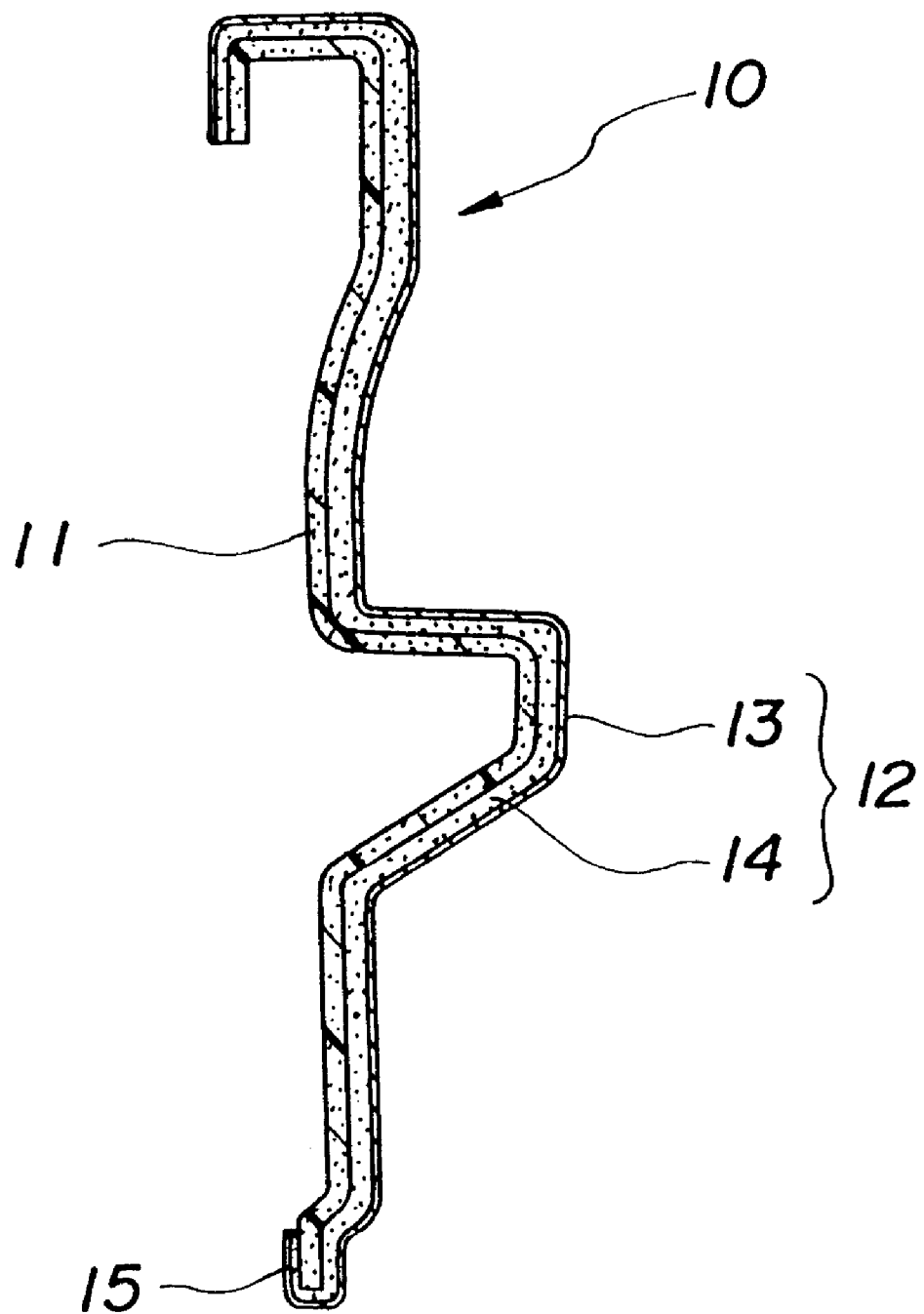
FIG. 1 is a sectional view showing an embodiment of the automotive interior component according to the present invention as applied to an automotive door trim.
Figure 2:
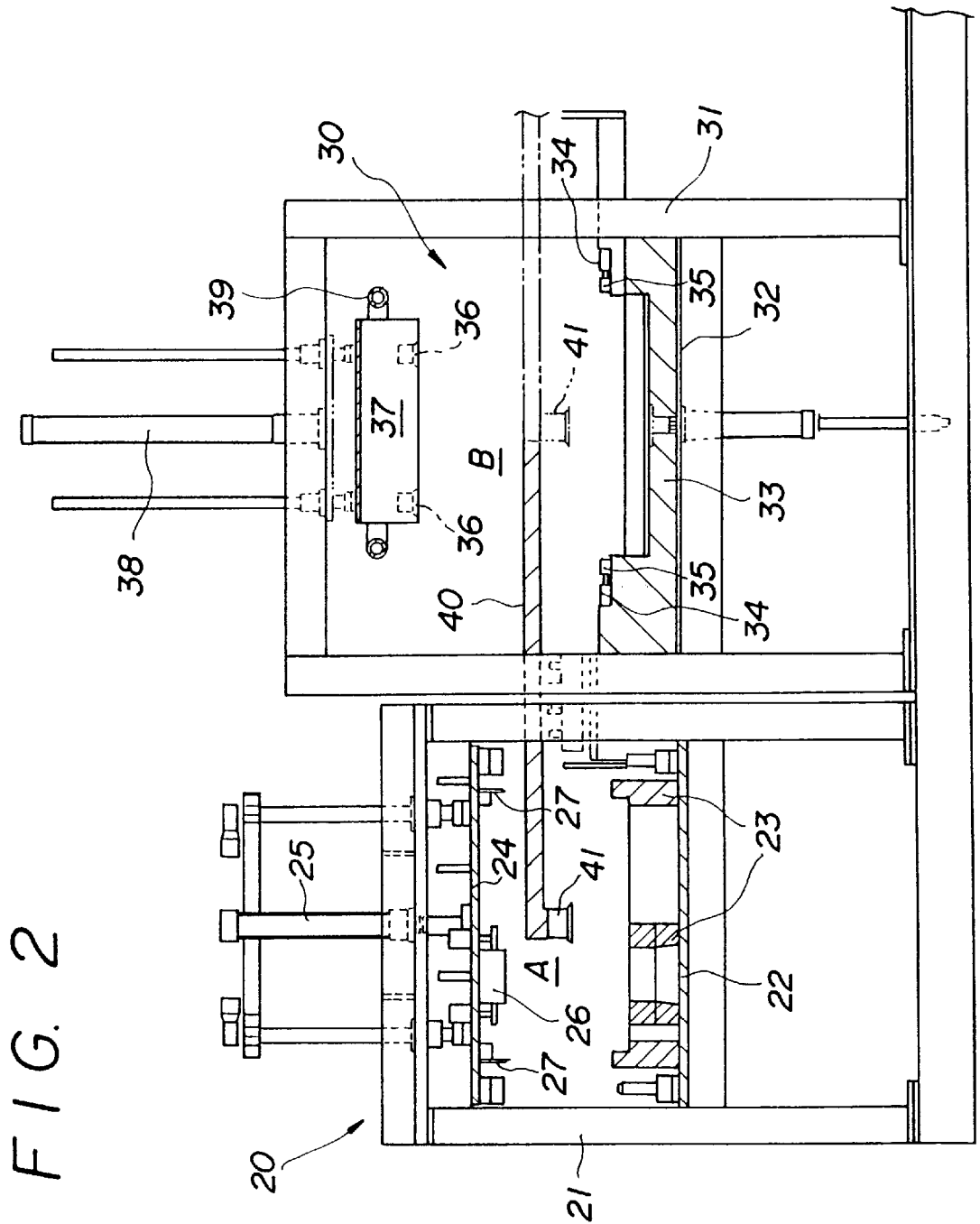
FIG. 2 is a sectional view showing the structure of the device for manufacturing the automotive door trim according to the present invention.

FIG. 1 is a sectional view of the structure of an embodiment of the automotive interior component according to the present invention as applied to an automotive door trim; FIG. 2 is a sectional view of a device for manufacturing a door trim according to the method of the present invention; and FIGS. 3 through 8 are sectional views showing the different steps of the method of the present invention.

First of all, the structure of the automotive door trim according to the present invention is described. This automotive door trim 10 essentially consists of a resin core member 11 molded into a required shape, and a surface skin member 12 integrally bonded over a surface of the resin core member 11.

More specifically, the resin core member 11 is made of such polyolefin resin as polypropylene resin by taking into account such considerations as cost, moldability and mechanical strength, and the surface skin member 12 consists of a laminated sheet in which a foamed layer 14 such as a polyethylene foam or a polypropylene foam is laminated over the reverse surface of a surface skin sheet 13 such as a PVC sheet. A peripheral portion 15 of the surface skin member 12 is intended to be folded over the reverse surface of the resin core member 11 along its edge, and is secured thereto by thermal welding.

Therefore, a primary difference from the conventional door trim is found in the fact that the peripheral portion 15 is secured by thermal welding instead of adhesive bonding.

Therefore, the need for such materials as a primer and a bonding agent can be eliminated, and the manufacturing steps such the steps of primer application and bonding agent application can be eliminated, thereby allowing simplification of the manufacturing facilities and reduction of the manufacturing cost.

Further, the impairment of the working condition through the use of a bonding agent can be avoided.

Now the method and device for manufacturing the automotive door trim 10 are described in the following.

FIG. 2 is a simplified view showing the structure of a manufacturing device for carrying out the method of the present invention. This device comprises a trimming device 20 forming a trim cut station A for cutting the resin core member 11 and the surface skin member 12 into desired shapes, and an edge processing device 30 forming an edge processing station B for the surface skin member 12 for carrying out an edge folding back step and a welding step.

Further, the trimming device 20 is provided with platforms 23 disposed on a lower table 22 supported by corner portions of a support frame 21 for receiving a half finished product W which is to be worked on. Above the platforms 23 is disposed an upper die 24 which is coupled to an actuating cylinder 25 for vertically moving the upper die 24. This upper die 24 is provided with a cutting blade 26 for forming an opening in the resin core member 11, and another cutting blade 27 for cutting off a peripheral portion of the surface skin member 12.

Now the structure of the edge processing device 30 for the surface skin member is described in the following.

As transport means for conveying the work from the trim cut station A to the edge processing station B, a transport cylinder 40 is arranged between the two stations. This transport cylinder 40 is provided with an air suction pad 41 for retaining a molded object by vacuum suction.

In this edge processing device 30, a platform 33 is provided on a lower table 32 which is supported by a support frame 31 at corner portions thereof, and a plurality of sliders 35 actuated by cylinders 34 are arranged around this platform 33. These sliders 35 are used for the purpose of folding back the peripheral portion 15 of the surface skin member 12 onto the reverse surface of the resin core member 11 along its edge.

Above the platform 33 is disposed a support member 37 which retains the molded object by air suction pads 36, and this support member 37 can be moved vertically by an actuating cylinder 38. A hot air supply pipe 39 is arranged around the support member 37 at its upper position.

The manufacturing device of the present invention is provided with the above described structure, and the method of the present invention is particularly characterized by the steps subsequent to the trimming step which are now going to be described in the following.

Figure 3:
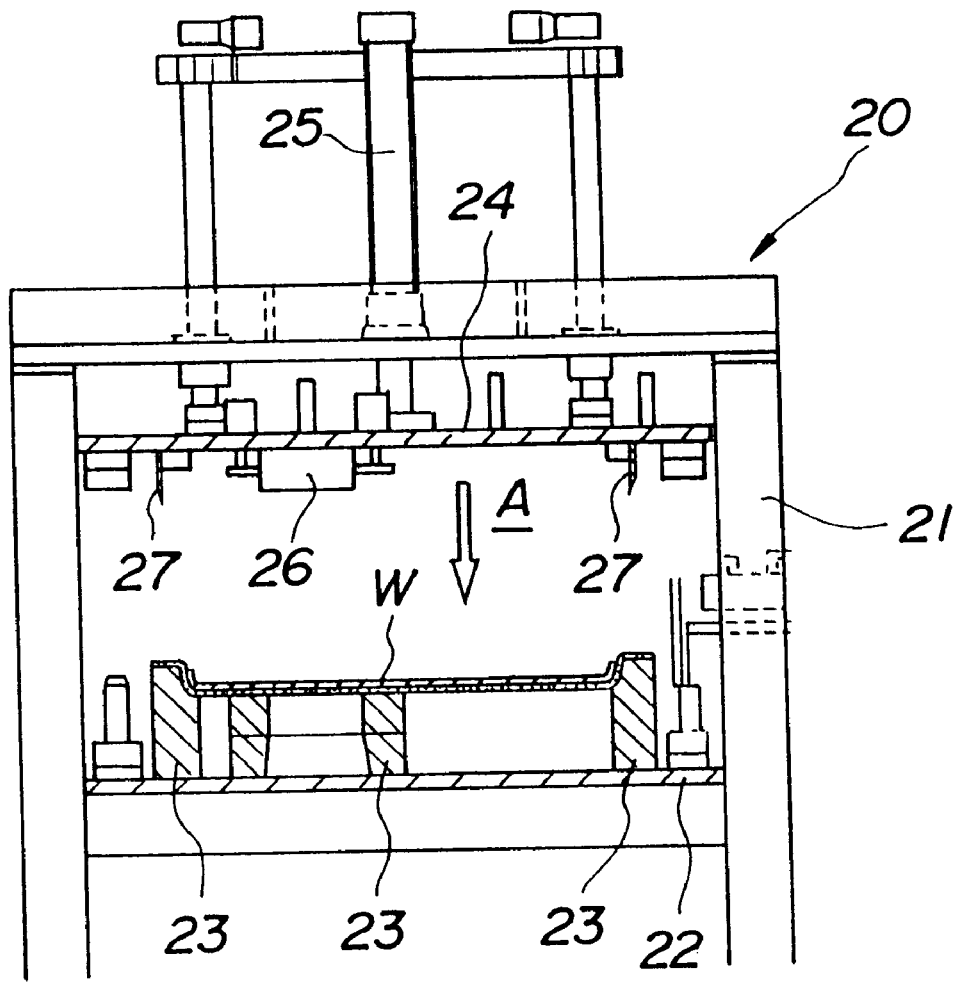
FIG. 3 is a sectional view showing a trimming step constituting one of the steps of the method of the present invention.

First of all, as illustrated in FIG. 3, after a half-finished product W is placed on the platforms 23, the resin core member 11 is pierced through and the peripheral edge of the surface skin member 12 is cut away in a desired shape by the cutting blades 26 and 27, respectively, as the upper die 24 is lowered by the action of the cylinder 25 in the trim cut station.

Figure 4:
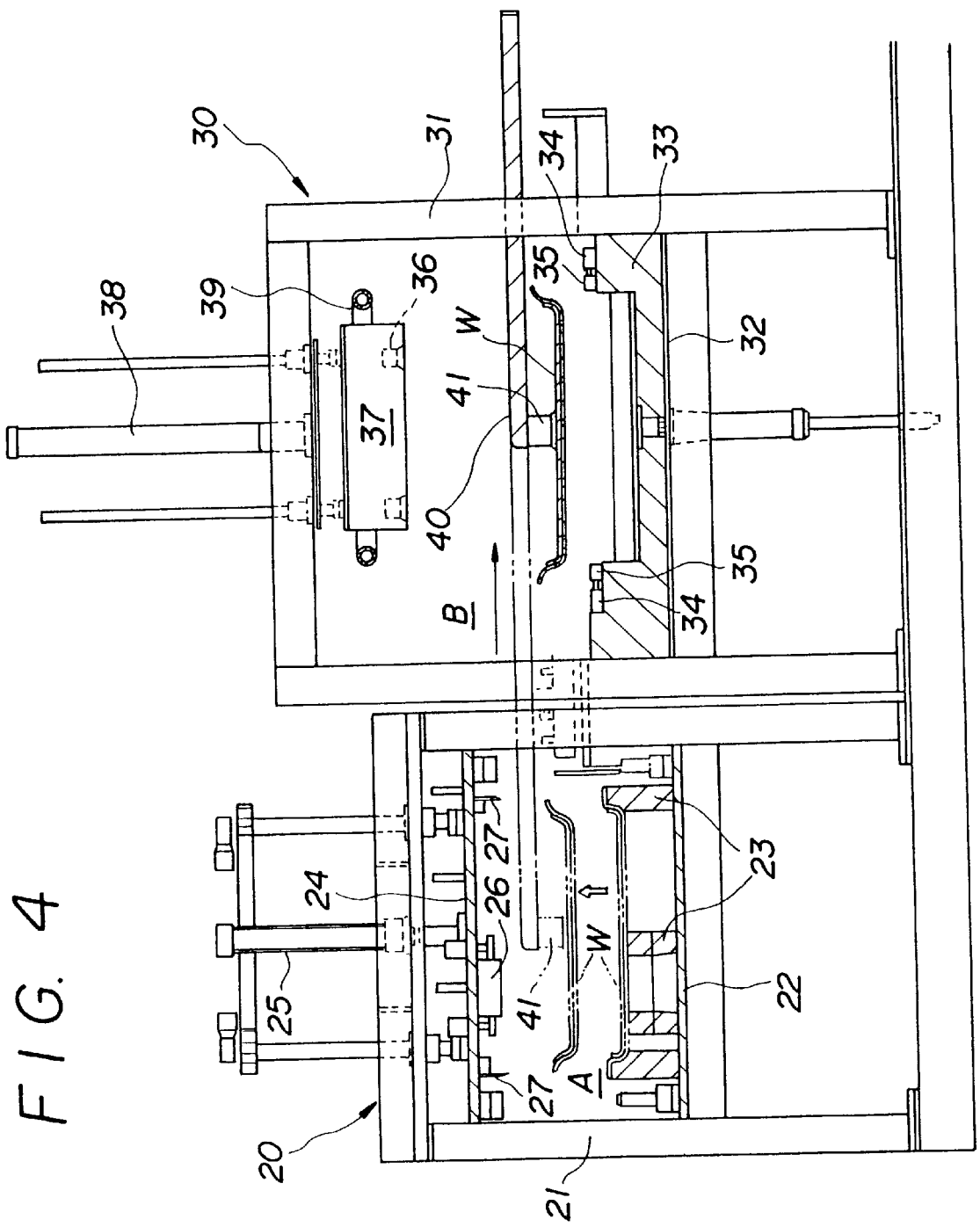
FIG. 4 is a sectional view showing a transport step constituting one of the steps of the method of the present invention.

Then, the half finished product W which was cut on the platforms 23 is retained and handled by the air suction pads 41 of the transport cylinder 40. Thereafter, as shown in FIG. 4, the transport cylinder 40 is driven from the position indicated by the chain-dot line to the position indicated by the solid line in FIG. 4 to convey the half finished product W to the edge processing station B.

Figure 5:
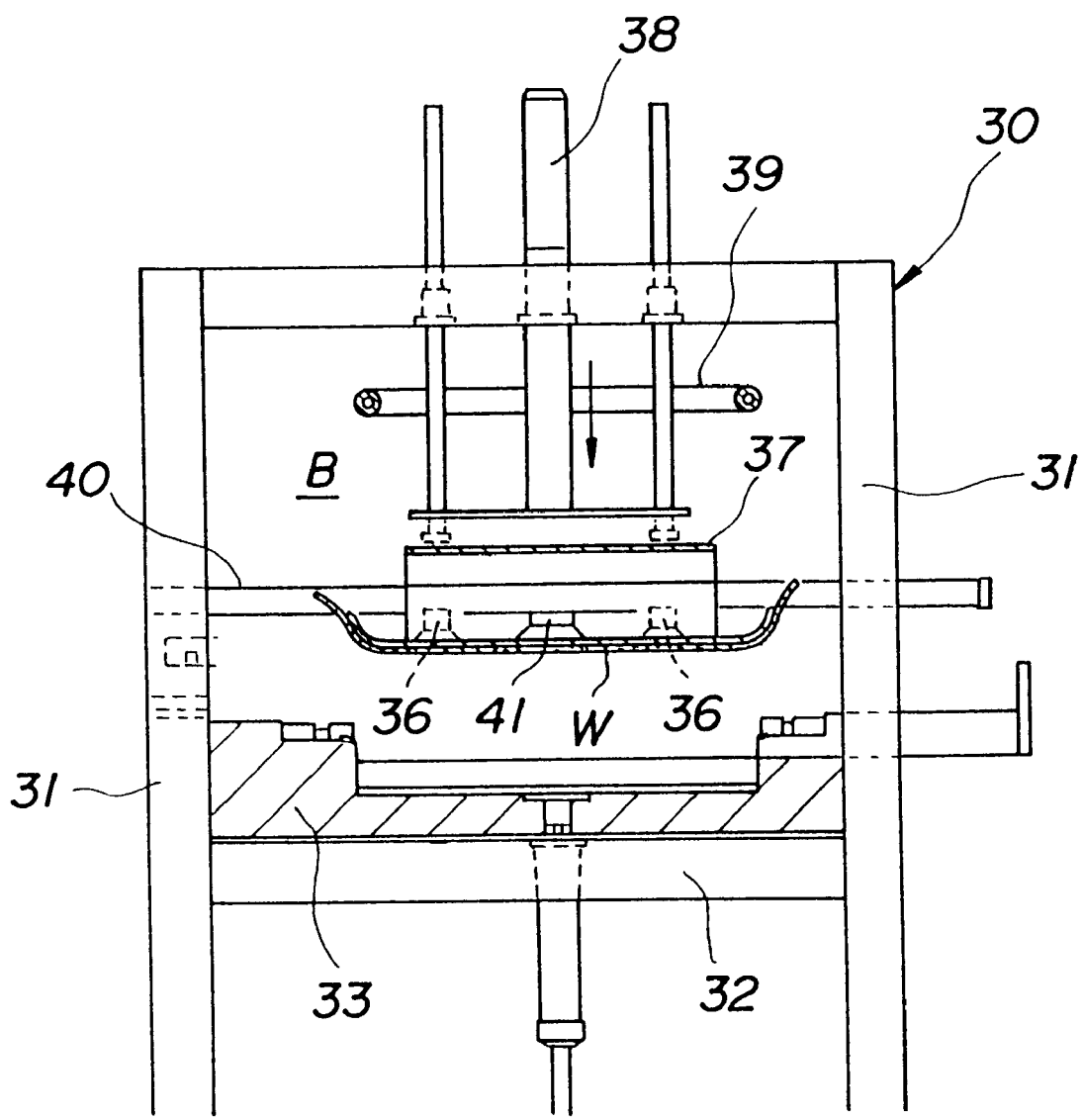
FIG. 5 is a sectional view showing a work retaining step in a edge processing step constituting one of the steps of the method of the present invention.

After the half finished product W is secured at the edge processing station B by the air suction pads 41, as shown in FIG. 5, the support member 37 is lowered by the actuating cylinder 38, and the suction of the air suction pads 41 of the transport cylinder 40 is shut off while the half finished product W is secured by the air suction pads 36 of the support member 37.

Figure 6:
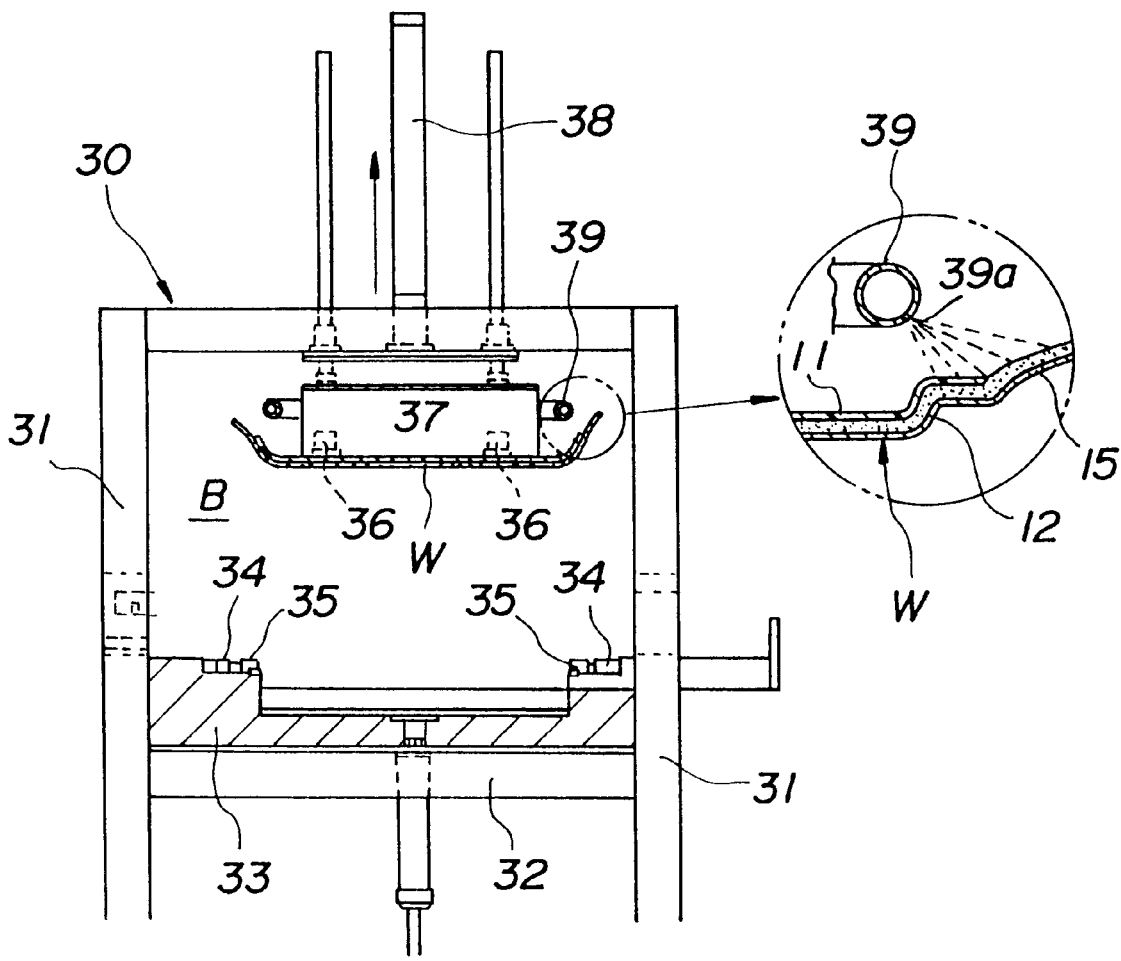
FIG. 6 is a sectional view showing a hot air blowing step constituting one of the steps of the method of the present invention.

After the transport cylinder 40 is retracted away from the edge processing station B, the support member 37 is lifted to the position indicated in FIG. 6 by the actuating cylinder 38.

Hot air from orifices 39a provided in the annular hot air supply pipe 39 is then blown to the reverse surface of the peripheral portion of the resin core member 11 and the reverse surface of the peripheral portion 15 of the surface skin member 12 which jointly form the half finished product W. The step of blowing hot air is carried out under the temperature condition of 250° C. or higher for the time duration of 10 seconds.

By this step of blowing hot air, the resin core member 11 and the foamed layer 14 are both heated to a temperature in the range of 170 to 230° C., and are in substantially molten state.

Figure 7:
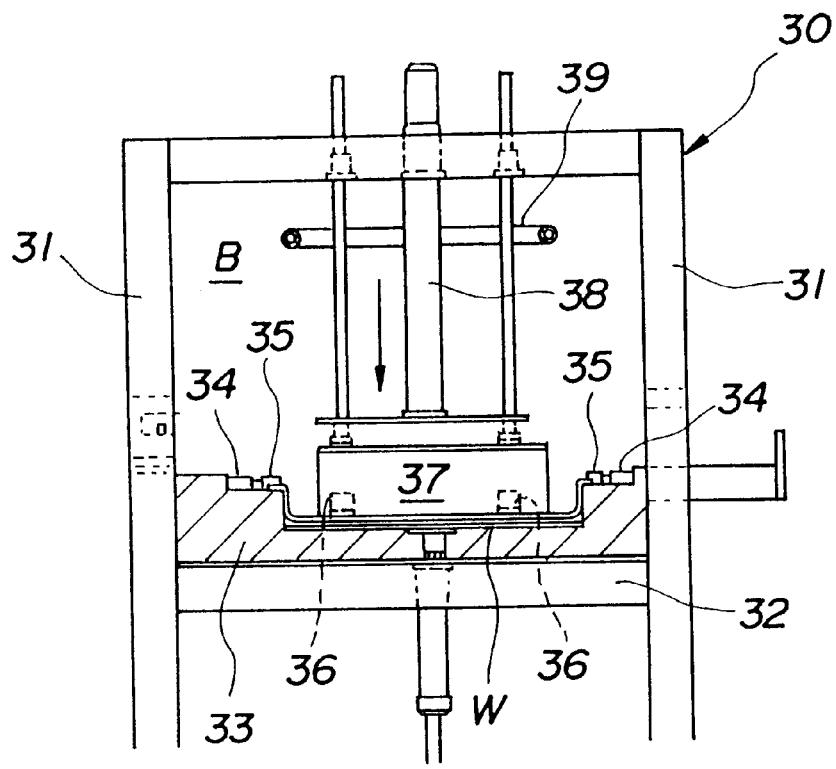
FIG. 7 is a sectional view showing a step of placing a half finished product on a platform constituting one of the steps of the method of the present invention.
Figure 8:
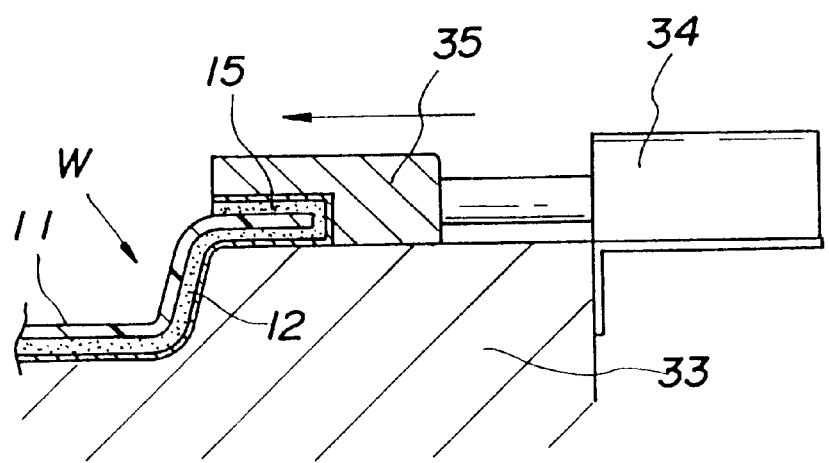
FIG. 8 is a sectional view showing a step of folding back a peripheral portion of the surface skin member constituting one of the steps of the method of the present invention.
Figure 9:
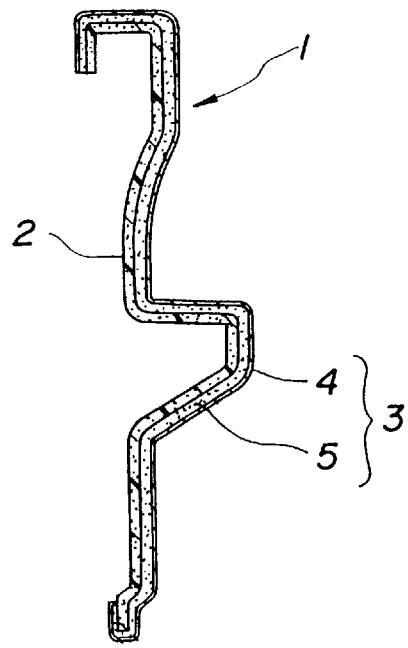
FIG. 9 is a sectional view showing the structure of a conventional automotive door trim.
Figure 10:
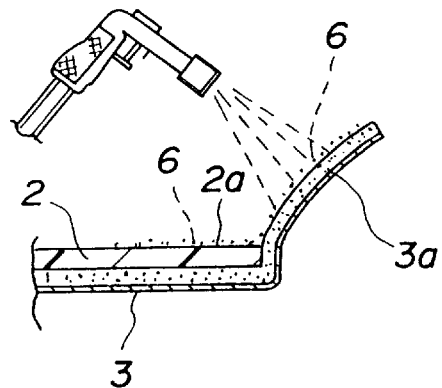
FIG. 10 is a sectional view showing an example of conventional folding back step.
Figure 11:
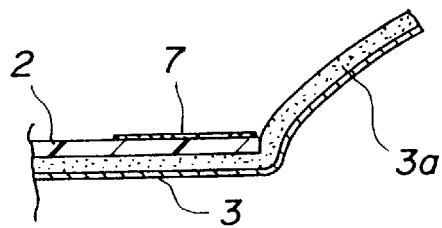
FIG. 11 is a sectional view showing an example of conventional folding back step.

With the reverse surface of the resin core member 11 and the reverse surface of the peripheral portion 15 of the surface skin member 12 in molten or semi-molten state, the support member 37 is lowered to its lowermost position by the cylinder 38, and the half finished product W is set up on the upper surface of the platform 33 (refer to FIG. 7).

Thereafter, the sliders 35 are moved forward and backward by the cylinders 34, and the peripheral portion 15 of the surface skin member 15 is folded back and secured on the reverse surface of the resin core member 11. Since the resin core member 11 has a favorable capability to retain heat, it is capable of favorable attachment for 10 seconds or more even after application of hot air is terminated.

In this way, by using the manufacturing device of the present invention shown in FIG. 2 and the manufacturing method of the present invention, it is possible to manufacture the automotive door trim 10 illustrated in FIG. 1 in an efficient and economical fashion.

As described above, according to the automotive interior component of the present invention, since the peripheral portion of the surface skin member which is to be folded back is thermally welded and secured to the reverse surface of the resin core member, the need for a bonding agent and a primer is eliminated, and, since not only the material cost due to the need for a bonding agent and a primer may be reduced but also the investment on manufacturing facilities may be avoided, a substantial cost reduction owing to the simplification of the production steps and the production facilities can be accomplished. In particular, since the two surfaces which are two be welded together are both brought to a molten or semi-molten state, a favorable welding result can be produced. Further, the melting of the two surfaces can be carried out by a common hot air blower at the same time, thereby minimizing the requirements for the hardware and simplifying the manufacturing process.

Further, elimination of the need for a bonding agent can improve the working environment, and no facilities for ventilation would be necessary. Additionally, according to the manufacturing device and the manufacturing method of the present invention, since efficient mass production of high quality automotive interior components is made possible in a reliable fashion without requiring a bonding agent and a primer, an improvement in both productivity and quality can be achieved.

Although the present invention has been described in terms of a specific embodiment, it is possible to modify and alter details thereof without departing from the spirit of the present invention.

What we claim is:

1. A method of manufacturing an automotive interior component by folding back and securing a peripheral portion of a surface skin member which is at least partly bonded over a surface of a resin core member onto a reverse surface of a peripheral edge portion of said resin core member, comprising the steps of:

providing a half-finished assembly of a resin core member and a surface skin member;

thermally melting said reverse surface of said peripheral edge portion of said resin core member and a reverse surface of said peripheral portion of said surface skin member by blowing hot air thereto, rendering said reverse surface of the resin core member and the reverse surface of the surface skin member in a molten or semi-molten state;

placing said half-finished assembly in said molten or semi-molten state on a platform; and folding back said peripheral portion of said surface skin member onto said reverse surface of said peripheral portion of said resin core member of said half-finished assembly in said molten or semi-molten state by moving a slider which has a portion suitable for the folded shape of said peripheral portion of said surface skin member, said slider being disposed around said platform and thermally welding said folded back peripheral portion of said surface skin member to said reverse surface of said peripheral edge portion of said resin core member simultaneously.

2. A method according to claim 1, wherein said resin core member consists of a polyolefin resin.

3. A method according to claim 2, wherein said resin core member consists of polypropylene resin.

4. A method according to claim 1, wherein said surface skin member consists of a laminated sheet formed by laminating a foamed layer over a reverse surface of a surface skin sheet.

5. A method according to claim 4, wherein said surface skin sheet consists of a PVC sheet.

6. A method according to claim 4, wherein said foamed layer consists of foamed polyethylene.

7. A method according to claim 4, wherein said foamed layer consists of foamed polypropylene.

* * * * *